No. 835,511. PATENTED NOV. 13, 1906.
N. FRANZEN.
METHOD OF AND MACHINE FOR MAKING WIRE GLASS.
APPLICATION FILED DEC. 1, 1905.
2 SHEETS—SHEET 1.
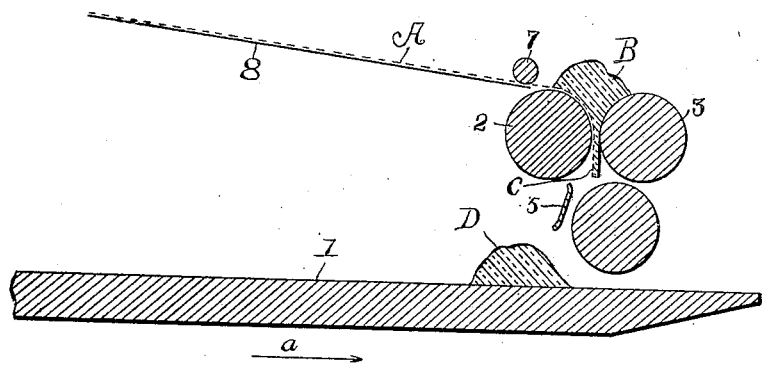
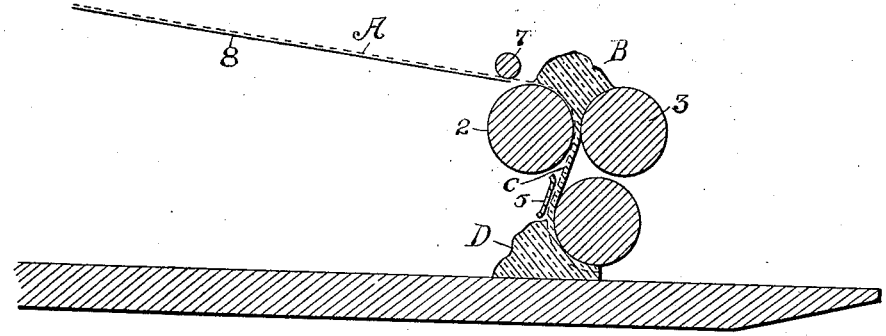
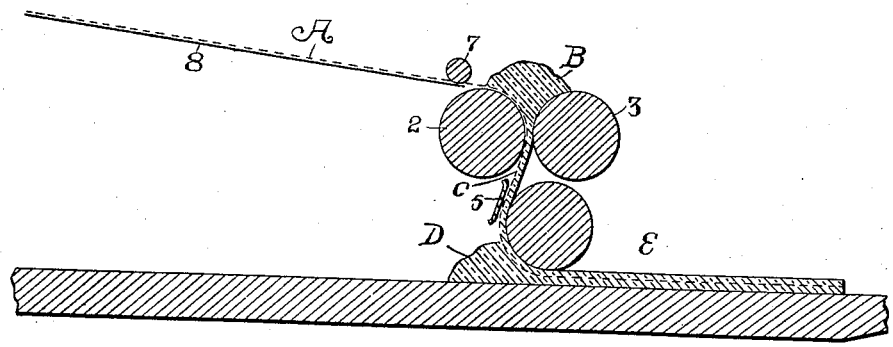
WITNESSES:
INVENTOR
Nicklas Franzen
by Christy and Christy,
Atty's No. 835,511. PATENTED NOV. 13, 1906.
N. FRANZEN.
METHOD OF AND MACHINE FOR MAKING WIRE GLASS.
APPLICATION FILED DEC. 1, 1905.
2 SHEETS—SHEET 2.
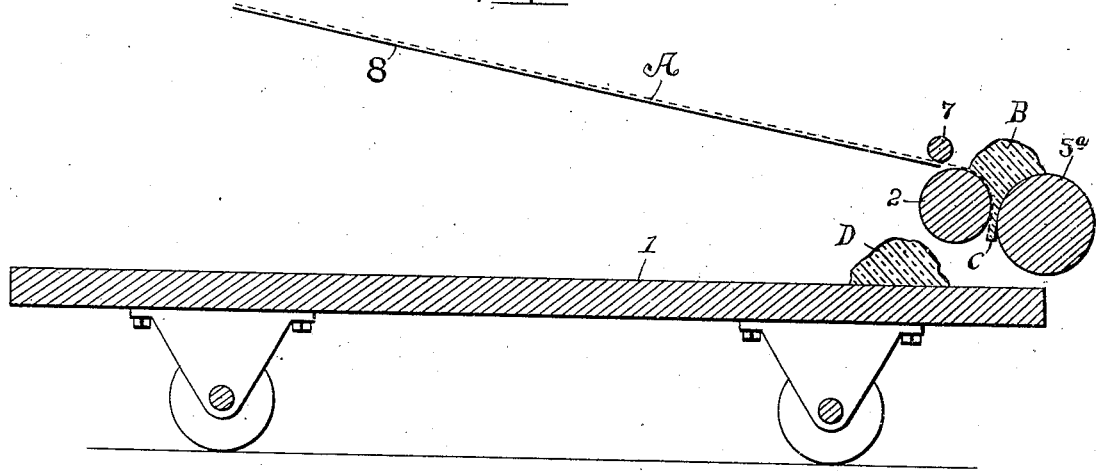
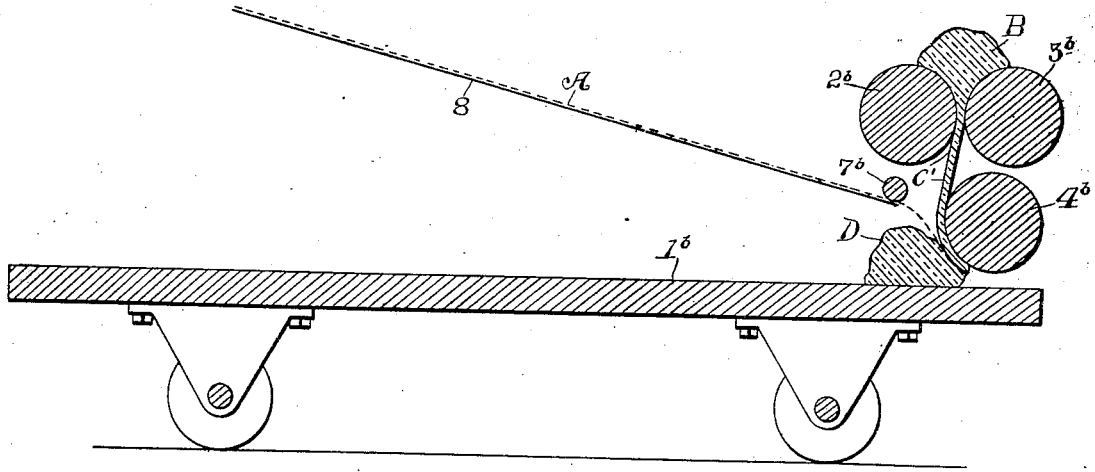
WITNESSES:
INVENTOR
Nicklas Franzen
by Christy and Christy, Atty's.

UNITED STATES PATENT OFFICE.

NICKLAS FRANZEN, OF MONONGAHELA, PENNSYLVANIA.

METHOD OF AND MACHINE FOR MAKING WIRE-GLASS.

No. 835,511.   Specification of Letters Patent.   Patented Nov. 13, 1906.

Application filed December 1, 1905. Serial No. 289,815.

*To all whom it may concern:*

Be it known that I, NICKLAS FRANZEN, a citizen of the United States, residing at Monongahela city, in the county of Washington and State of Pennsylvania, have invented or discovered a certain new and useful Improvement in Methods of and Machines for Making Wire-Glass, of which improvement the following is a specification.

My invention relates to improvements in methods of and machines for making wire-glass; and the object of my improvement is simplicity of structure and efficiency in operation.

Wire-glass in commercial form is a sheet or plate of glass having embedded within it a netting or fabric of fine iron wire.

It will be understood that by the machine of my present invention not only wire-netting, but other substances in other forms may be incorporated within a sheet of glass. While not limiting my invention in this regard, I shall for the sake of simplicity designate the incorporated substance as "wire" or "fabric."

In the accompanying drawings, which form part of this specification, Figures 1, 2, and 3 show diagrammatically in longitudinal section and in successive operative position a machine which embodies my invention. Figs. 4 and 5 are similar views illustrating modifications.

Parts which are repeated in the several figures bear the same reference-numerals in each case.

The machine consists, essentially, of a casting-table 1, whereon a sheet of wire-glass may be formed and whereon the finished sheet may be supported and conveyed to the annealing-oven, and of means for forming a component layer of the sheet above the casting-table and for spreading molten glass upon the casting-table and for simultaneously incorporating the glass so spread with the independently-formed layer to form the finished sheet.

The means for forming a layer above the casting-table consists of a pair of rolls 2 and 3, so arranged as to form between them a hopper-like receptacle wherein molten glass may be teemed and by suitable rotation of the rolls formed into such component layer. One of the rolls which thus coöperate to form a layer may, as shown at $3^a$ in Fig. 4, coöperate with table 1 also to spread molten glass thereon and incorporate the glass so spread with the layer formed between the roll in the manner presently to be described. I prefer, however, to provide independent means for this end, as shown in Figs. 1-3 and in Fig. 5, in a separate roll 4.

It will be understood that in order to spread molten glass upon the casting-table 1 the spreading-roll and the table must be relatively movable, and in this respect my preferred construction is that which the drawings show, casting-table 1 being mounted upon wheels to advance beneath the rolls, which are preferably mounted in relatively immovable positions. Rolls 2 and 3 (or $3^a$) are suitably spaced from one another to produce a layer of desired thickness, and roll 4 (or $3^a$) is suitably spaced above casting-table 1 to form the finished sheet.

In the form of my improved machine shown in Figs. 1-4 a chute 8 for the wire fabric is provided to feed the fabric over the surface of roll 2 and into the hopper-like receptacle formed by rolls 2 and 3. Means may be provided for placing the fabric as it is progressively fed over the surface of roll 2 under tension in order that the wire may lie smoothly on the surface of roll 2 and not rise therefrom to allow an appreciable thickness of glass to pass beneath the wire, which would result in a displacement of the wire in the finished sheets. Convenient means to the end stated may be found in a roll 7, arranged to coöperate with the surface of chute 8 and to exert a binding or holding action upon the wire as it passes beneath the roll. The weight or drag of the glass as it passes from between rolls 2 and 3 will effect a tension upon the wire held above by roll 7. Roll 7 is conveniently placed at or near the delivery edge of chute 8, as shown in the drawings.

In the form of machine shown in Fig. 5 the wire fabric is introduced not into the pass between rolls $2^b$ and $3^b$, but is introduced into the pass between roll $4^b$ and casting-table $1^b$, and in entering this pass it is interposed between the layer formed between roll $2^b$ and $3^b$, which layer is borne on the surface of roll $4^b$, and the molten glass which is teemed on the casting-table $1^b$ as roll $4^b$, bearing the layer aforesaid, advances to spread such molten glass to layer form. To this end chute 8$^b$ is suitably arranged to feed the fabric to the pass beneath roll 4$^b$, as shown in the said figure.

In order to prevent the layer of glass formed between rolls 2 and 3 in the manner presently to be described from displacement in passing downward and from buckling upon the table, a guide-plate 5 may be introduced rearward of roll 4. (The direction of movement is indicated by the arrow *a.*) This serves to insure the proper passage of the layer forward between rolls 2 and 3 downward to the pass between the casting-table and the uniting-roll. It will be understood that this guide-plate is employed only when the spacing of the parts and conditions of use make it necessary or desirable.

The operation of this machine may be briefly described. The operative parts being in the position shown in Fig. 1, wire fabric A is carried down chute 8, beneath tension-roll 7, (by which it is also flattened,) over the face of roll 2, and downward into the pass between rolls 2 and 3. A batch of molten glass B is then teemed into the receptacle which rolls 2 and 3 form, whereupon suitable rotation of rolls 2 and 3, which will be accompanied on the advance of table 1 in the direction indicated by arrow *a* by means well known in the art, will effect the formation of a layer of glass C, having incorporated in its rearward face the wire fabric. It will be observed that since the molten glass B is spread upon the wire as it lies upon the face of roll 2 the wire is incorporated in the glass without strain. It will be further noted that the tension which is exerted on the wire will be sufficient to keep the latter lying smooth upon the face of roll 2. Meanwhile a second batch of molten glass B is teemed upon the forward portion of table 1. The progress of the table causes roll 4 to retreat and spread this molten glass, and as this roll retreats it carries upon its face the layer C, with the wired surface exposed. This advance of roll 4 not only spreads the molten glass, it simultaneously unites the glass with the wire-containing layer and incorporates the whole into the finished sheet of wire-glass E.

The operation of the machine in the form shown in Fig. 4 is identical with the described operation of the form of Fig. 1, roll 3$^a$ in this case performing the parts which in the form already described were performed by rolls 3 and 4. The operation of the form shown in Fig. 5 differs only in the circumstance that the fabric A is introduced between the layer C' (which in this case is formed without wire) and the batch of glass D as roll 4$^b$, faced or covered with layer C', retreats to spread the molten glass D and incorporate it with layer C' to form the finished sheet. The wire so interposed will occupy the position in the finished article which it occupies when introduced as in Fig. 1; but it will be noted that it comes into contact with batch D when in molten condition and not into contact with batch B when in molten condition. The fabric may be held under tension by roll 7$^b$, coöperating with chute 8$^b$, for substantially the same purpose that it is placed under tension in the form of machine shown in Fig. 1.

I claim as my invention—

1. In a machine for making plate-glass, the combination of a casting-table whereon a sheet of glass may be formed and carried, means for forming above said casting-table a component layer of the finished sheet, and means for spreading molten glass to layer form upon said casting-table and for progressively uniting such last-named layer as it is spread with said layer formed above, substantially as described.

2. In a machine for making wire-glass, the combination of a casting-table whereon a sheet of wire-glass may be formed and carried, means for forming above said casting-table a wire-including component layer of the finished sheet, and means for spreading molten glass to layer form upon said casting-table and for progressively uniting such last-named layer as it is spread with said wire-including layer, substantially as described.

3. In a machine for making wire-glass, the combination with a casting-table whereon a sheet of wire-glass may be formed and carried, means for forming above said casting-table a wire-including component layer of the finished sheet and means for receiving such wire-including component layer and for spreading molten glass to layer form upon said casting-table beneath said wire-including layer, substantially as described.

4. In a machine for making wire-glass the combination of a casting-table whereon a sheet of wire-glass may be formed and carried, means for forming upon a suitable surface above said casting-table a wire-including component layer of the finished sheet, means for feeding wire fabric under tension over such suitably-arranged surface, and means for spreading upon said casting-table molten glass to layer form and progressively uniting said last-named layer with said wire-including layer as the layer upon the casting-table is spread, substantially as described.

5. In a machine for making wire-glass, the combination of a casting-table, means for forming above said casting-table a component layer of the finished sheet, means for spreading molten glass to layer form upon said casting-table and for progressively uniting with such layer as it is spread upon the casting-table the layer formed above as aforesaid, and means for guiding such layer formed above in its descent to the casting-table, substantially as described.

6. The herein-described method of making wire-glass which consists in teeming a mass of molten glass upon a movable table, forming above the table and out of contact therewith a wire-including component layer of the finished sheet, and spreading the mass of glass upon the table by means operative through the wire-including layer, substantially as described.

In testimony whereof I have hereunto set my hand.

NICKLAS FRANZEN.

Witnesses:
BAYARD H. CHRISTY,
CHARLES BARNETT.